Aug. 9, 1927.
J. P. BALDWIN
1,638,235
SHOCK ABSORBER
Original Filed Dec. 27, 1921
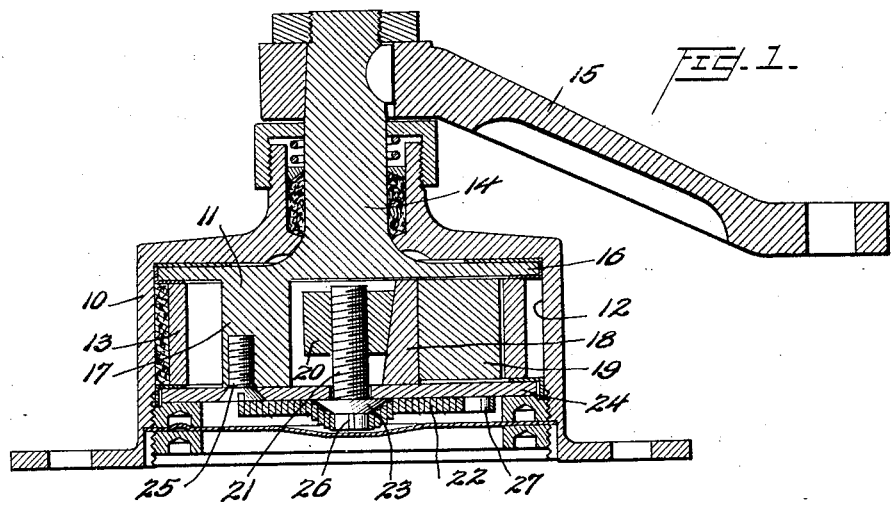
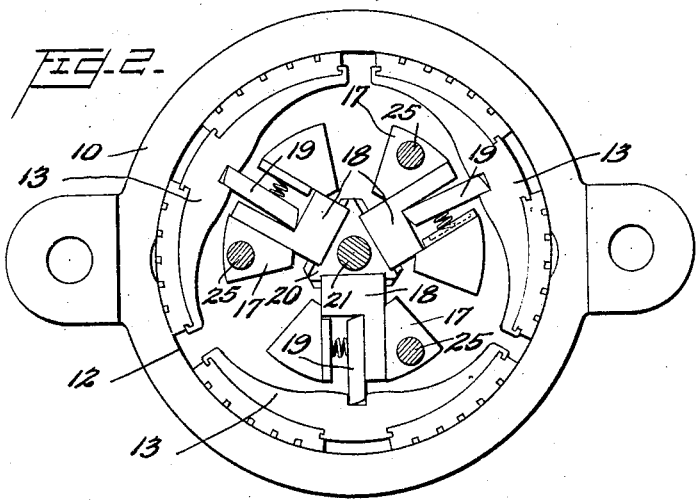
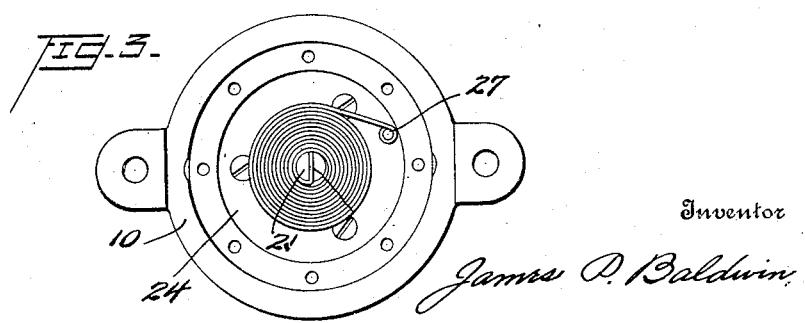
Inventor
James P. Baldwin
By Watson, Coit, Morse & Grindle
Attorney Patented Aug. 9, 1927.

1,638,235

UNITED STATES PATENT OFFICE.

JAMES PIERCE BALDWIN, OF LOS ANGELES, CALIFORNIA.

SHOCK ABSORBER.

Original application filed December 27, 1921, Serial No. 525,082. Divided and this application filed May 6, 1926. Serial No. 107,253.

The present invention relates to shock absorbers and particularly to shock absorbers operating in conjunction with vehicle springs and provided with means for the regulation of the damping effect of the absorber on the spring.

In my copending application, Serial No. 525,082, filed December 27, 1921, I illustrate and describe in detail a shock absorber of the friction type having two relatively rotatable members, one of which is adapted to be secured to the frame of the vehicle and the second of which is adapted to be connected to an axle. The first of these members constitutes a base and is provided with an internal cylindrical friction surface and the second comprises a frame which carries means to frictionally engage such friction surface upon the occurrence of relative rotative movement of said members in one direction and to substantially disengage said member when relative movement occurs in the opposite direction. Means is provided for automatically compensating for wear of the various parts which make up this friction producing mechanism. The present application is a division of the application above mentioned and has for its subject matter one form of the means for effecting adjustment of the friction producing mechanism which, altho fully disclosed in said application, is not specifically claimed therein.

In the accompanying drawings the shock absorber is illustrated; in axial section in Figure 1, in transverse in Figure 2, and in bottom plan in Figure 3.

The exact construction and mode of operation of the shock absorber being set forth at length in the application of which this is a division it is not necessary, in the present application, to describe the entire shock absorber in detail. In order that the correlation of the mechanism herein claimed to the other operative parts of the absorber may be fully understood, however, the main elements of the entire assembly will be briefly described. It will be understood that the invention claimed herein is, however, not limited in its application to shock absorbers of the exact type illustrated and described, that it is adapted for use in connection with shock absorbers which differ considerably in structure and mode of operation, and further that the design and arrangement of the component elements of the adjusting mechanism itself may be varied in adapting the same to different types of shock absorbers without departing from the spirit and scope of the invention.

The base of the shock absorber, which is particularly adapted to be secured to the frame of a vehicle, is indicated at 10 and the frame at 11. The base is provided with an internal cylindrical friction face 12 against which the three friction shoes 13 are thrust upon the occurrence of relative rotation of the base and frame in one direction, with the result that great frictional resistance to such relative movement is brought into play. These shoes substantially release themselves from friction surface 12 upon the occurrence of relative movement of base and frame in the opposite direction. In other words, the shock absorber is of the "one way" type.

The frame 11 is provided with an axially extending spindle 14 to the end of which is keyed arm 15 which arm is in turn connected by any suitable means (not illustrated) to the axle of a vehicle so that relative rotation of the frame and axle results in rotation of the frame within the base or casing 10. The frame has also a disk-like portion 16 provided with a plurality of upstanding lugs 17 equidistantly spaced around its axis. These lugs are arranged in pairs and the adjacent faces of the lugs of each pair are parallel, the spaces between these mutually facing surfaces constituting trackways for the strut seats 18. Struts 19 have their inner ends articulated on suitable outwardly facing surfaces of the strut seats and their outer ends engaging the shoes 13. The inner faces of the strut seats are inclined as shown in Figure 1 and bear respectively against the correspondingly inclined faces of a central wedge member or nut 20. The thrust of the struts is transmitted directly by the strut seats to this central wedge member in the operation of the shock absorber.

It is obvious that in the long continued operation of a frictional shock absorber of the type just described wear will occur in the operating parts as well as compression of the leather facings of the friction shoes, if such facings are employed. For this reason it is desired that the nut or supporting wedge member 20 be made adjustable in order that it may be moved from time to time to displace the strut seats outwardly to compensate for this wear. It is further desirable to have the adjusting mechanism rigidly maintain the strut seats in adjusted position after adjustment has been effected. I have found the adjusting mechanism illustrated to be quite effective in automatically bringing about adjustment and in rigidly maintaining the adjusted elements in their new positions.

This adjusting mechanism includes the axial member or bolt 21 which has threaded engagement with an axial aperture in the wedge 20 and a coiled spring 22 which constantly exerts a force on the outer end of this bolt tending to turn it to cause the nut to advance. Bolt 21 is provided with a head 23 the flat inner surface of which seats on the margin of a circular aperture in a disk 24 secured by screws 25 to the outer ends of lugs 17. The outer end of the bolt, beyond the head 23, is slotted as at 26 for the reception of one end of the adjusting spring 22. The outer end of the adjusting spring is anchored to the disk 24 as at 27 in any suitable manner.

In originally assembling the shock absorber spring 22 is applied so as to have an initial tension for this spring, which constantly acts, during the entire life of the shock absorber, on the adjusting bolt and tends to turn the same to draw the wedge 20 toward the head of the bolt and thereby to thrust the strut seats 18 radially outward. Whenever sufficient wear of the parts occurs such adjustment is in fact automatically effected and it is entirely unnecessary for manual adjustments to be made. For this reason the adjusting mechanism may be applied to the shock absorber in a position which is normally inaccessible, that is, which is not accessible unless the shock absorber is removed from the vehicle to which it is applied. While the thrust of the struts 18 on the strut seats normally tends to effect movement of the wedge 20 outwardly it will be seen that because of the engagement of the head of the adjusting bolt 23 with the disk 24 no movement can result. The strut seats are therefore held rigidly in adjusted position.

It will be understood, as previously explained, that the automatic adjusting mechanism may be applied to shock absorbers which vary in design and construction from that illustrated and also that, in applying the adjusting mechanism to different types of shock absorbers minor changes may be made in the shape and arrangement of its component elements.

Having thus described the invention what is claimed as new and desired to be secured by Letters Patent is:

1. In a shock absorber, in combination, members adapted to be attached respectively to relatively movable parts, means associated with said members whereby relative movement thereof in one direction is frictionally opposed, said means including an adjustable element for taking up wear of the operating parts of the shock absorber, and means whereby said element is automatically adjusted as wear occurs, said last mentioned means holding the element against movement due to the action of the friction producing means in the normal operation of the shock absorber.

2. In a shock absorber, in combination, members adapted to be attached respectively to relatively movable parts, means associated with said members whereby relative movement thereof in one direction is frictionally opposed, said means including an adjustable wedge for taking up wear of the operating parts of the shock absorber, and means whereby said wedge is automatically adjusted as wear occurs, said last mentioned means holding the wedge against movement due to the action of the friction producing means in the normal operation of the shock absorber.

3. In a shock absorber of the class described, in combination, relatively rotatable concentric base and frame members, one of said members having an internal annular face, brake shoes interposed between said members and adapted to bear against said annular face, means for thrusting said brake shoes against said face upon the occurrence of relative movement of said members in one direction of rotation and for releasing the same upon occurrence of such motion in the opposite direction, said means including a strut for each brake shoe having its outer end in contact with the corresponding shoe and its inner end contacting with an adjustable seat, and a device for automatically adjusting such seats and rigidly maintaining them in adjusted position.

4. In a shock absorber of the class described, in combination, relatively rotatable concentric base and frame members, one of said members having an internal annular face, brake shoes interposed between said members and adapted to bear against said annular face, means for thrusting said brake shoes against said face upon the occurrence of relative movement of said members in one direction of rotation and for releasing the same upon occurrence of such motion in the opposite direction, said means including a strut for each brake shoe having its outer end in contact with the corresponding shoe and its inner end contacting with an adjustable seat, a device for automatically adjusting such seats and rigidly maintaining them in adjusted position, said device including a wedge in contact with all of said seats, and means exerting a substantially constant force on said wedge tending to adjust said strut seats outwardly while at the same time positively preventing movement of said wedge inwardly.

5. In a shock absorber of the class described, in combination, relatively rotatable concentric base and frame members, one of said members having an internal annular face, brake shoes interposed between said members and adapted to bear against said annular face, means for thrusting said brake shoes against said face upon the occurrence of relative movement of said members in one direction of rotation and for releasing the same upon occurrence of such motion in the opposite direction, said means including a strut for each brake shoe having its outer end in contact with the corresponding shoe and its inner end contacting with an adjustable seat, a device for automatically adjusting such seats and rigidly maintaining them in adjusted position, said device including a wedge in contact with all of said seats, a screw having threaded engagement with the wedge, and held by the frame against axial movement in one direction, and a spring exerting a substantially constant turning force on the screw.

6. In a shock absorber of the class described, in combination, relatively rotatable concentric base and frame members, one of said members having an internal annular face, brake shoes interposed between said members and adapted to bear against said annular face, means for thrusting said brake shoes against said face upon the occurrence of relative movement of said members in one direction of rotation and for releasing the same upon occurrence of such motion in the opposite direction, said means including a strut for each brake shoe having its outer end in contact with the corresponding shoe and its inner end contacting with an adjustable seat, a device for automatically adjusting such seats and positively maintaining them in adjusted position, said device including a wedge in contact with all of said seats, a headed screw extending thru a portion of the frame and having threaded engagement with the wedge and a spring exerting a substantially constant turning force on the screw, the screw head bearing constantly against the portion of the frame through which it extends, by which it is supported against longitudinal movement in one direction.

In testimony whereof I hereunto affix my signature.

JAMES PIERCE BALDWIN.